United States Patent
Billard et al.

(10) Patent No.: US 9,981,826 B2
(45) Date of Patent: May 29, 2018

(54) BRAKING DEVICE FOR BRAKING A HOISTED OBJECT RELATIVE TO A GUIDE MEMBER

(71) Applicant: Otis Elevator Company, Farmington, CT (US)

(72) Inventors: Justin Billard, Amston, CT (US); Daryl J. Marvin, Farmington, CT (US); Randall S. Dube, Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 0 days. days.

(21) Appl. No.: 14/911,167

(22) PCT Filed: Sep. 11, 2013

(86) PCT No.: PCT/US2013/059253
§ 371 (c)(1),
(2) Date: Feb. 9, 2016

(87) PCT Pub. No.: WO2015/038116
PCT Pub. Date: Mar. 19, 2015

(65) Prior Publication Data
US 2016/0200549 A1    Jul. 14, 2016

(51) Int. Cl.
*B66B 5/22* (2006.01)
*B66B 5/24* (2006.01)
*F16D 121/14* (2012.01)

(52) U.S. Cl.
CPC ............... *B66B 5/22* (2013.01); *B66B 5/24* (2013.01); *F16D 2121/14* (2013.01)

(58) Field of Classification Search
CPC .... B66B 5/18; B66B 5/22; B66B 5/24; F16D 59/02; F16D 2121/14; F16D 2121/20
See application file for complete search history.

(56) References Cited

U.S. PATENT DOCUMENTS

| | | | |
|---|---|---|---|
| 859,718 A * | 7/1907 | Abbott | B66B 5/22 187/372 |
| 2,150,373 A * | 3/1939 | Hymans | B66B 5/22 187/376 |

(Continued)

FOREIGN PATENT DOCUMENTS

| | | |
|---|---|---|
| CN | 1217290 | 5/1999 |
| CN | 2583061 | 10/2003 |

(Continued)

OTHER PUBLICATIONS

English Language Translation of CN Office Action for CN Appln. No. 2013800795483 dated May 31, 2017.

*Primary Examiner* — Minh Truong
(74) *Attorney, Agent, or Firm* — O'Shea Getz P.C.

(57) ABSTRACT

A braking device is operable to aid in braking a hoisted object relative to a guide member. The braking device includes a mounting structure connected to the hoisted object, and first and second brake pads positioned on the mounting structure on opposing sides of a passageway through which the guide member extends. The first and second brake pads each include a contact surface that is operable to frictionally engage the guide member. The second brake pad engages the mounting structure in a manner that enables the second brake pad to move relative to the mounting structure between a non-braking position and a braking position. The braking device includes a brake initiator that is selectively operable to initiate movement of the second brake pad from the non-braking position toward the braking position by selectively actuating an actuatable portion of the brake initiator from a non-deployed position to a deployed position.

15 Claims, 14 Drawing Sheets

(56) References Cited

U.S. PATENT DOCUMENTS

| | | | |
|---|---|---|---|
| 5,096,020 A * | 3/1992 | Korhonen | B66B 5/22 187/359 |
| 5,228,540 A | 7/1993 | Glaser | |
| 5,301,773 A | 4/1994 | Jamieson et al. | |
| 5,979,615 A * | 11/1999 | Thompson | B66B 5/18 188/251 A |
| 6,109,398 A * | 8/2000 | Lempio | B66B 5/18 187/376 |
| 6,173,813 B1 | 1/2001 | Rebillard et al. | |
| 6,446,769 B1 | 9/2002 | Kangiser et al. | |
| 7,299,898 B2 | 11/2007 | Husmann | |
| 7,677,362 B2 * | 3/2010 | Shimohata | B66B 5/06 187/277 |
| 7,717,236 B2 | 5/2010 | Mustalahti et al. | |
| 7,753,176 B2 | 7/2010 | Kigawa et al. | |
| 8,186,483 B2 | 5/2012 | Sirigu et al. | |
| 8,312,972 B2 | 11/2012 | Gremaud et al. | |
| 2011/0088983 A1 * | 4/2011 | Sirigu | B66B 5/22 187/373 |
| 2011/0272223 A1 | 11/2011 | Drayer et al. | |
| 2011/0308895 A1 | 12/2011 | Shen et al. | |
| 2012/0000731 A1 | 1/2012 | Schienda et al. | |
| 2012/0152663 A1 | 6/2012 | Legeret et al. | |
| 2013/0025974 A1 | 1/2013 | Piech et al. | |
| 2013/0313052 A1 | 11/2013 | Della Porta | |
| 2014/0008157 A1 | 1/2014 | Terry et al. | |
| 2014/0041967 A1 | 2/2014 | Wei | |

FOREIGN PATENT DOCUMENTS

| | | |
|---|---|---|
| CN | 1886320 | 12/2006 |
| CN | 102887411 | 1/2013 |
| JP | 2008303014 | 12/2008 |

* cited by examiner

BRAKING DEVICE FOR BRAKING A HOISTED OBJECT RELATIVE TO A GUIDE MEMBER

This application claims priority to PCT Patent Application No. PCT/US2013/059253 filed Sep. 11, 2013.

BACKGROUND

1. Technical Field

Aspects of the present invention relate to a braking device, and more particularly relate to a braking device that is operable to aid in braking a hoisted object relative to a guide member.

2. Background Information

Hoisting systems (e.g., elevator systems, crane systems) often include a hoisted object (e.g., an elevator car), a counterweight, a tension member (e.g., a rope, a belt) that connects the hoisted object and the counterweight, and a sheave that contacts the tension member. During operation of such hoisting systems, the sheave may be selectively driven (e.g., by a machine) to selectively move the hoisted object and the counterweight. Hoisting systems also often include braking device that aids in braking (e.g., slowing and/or stopping movement of) the hoisted object relative to a guide member (e.g., a rail, a wire, etc.). Aspects of the present invention are directed to an improved braking device.

SUMMARY OF ASPECTS OF THE INVENTION

According to an aspect of the present invention, a braking device is provided that is operable to aid in braking a hoisted object relative to a guide member. The braking device includes a mounting structure, first and second brake pads, and a brake initiator. The mounting structure is connected to the hoisted object. The first and second brake pads are positioned on the mounting structure so that they are on opposing sides of a passageway through which the guide member extends. The first and second brake pads each include a contact surface that is operable to frictionally engage the guide member. The second brake pad engages the mounting structure in a manner that enables the second brake pad to move relative to the mounting structure between a non-braking position and a braking position. The brake initiator is selectively operable to initiate movement of the second brake pad from the non-braking position toward the braking position by selectively actuating an actuatable portion of the brake initiator from a non-deployed position to a deployed position.

According to an alternative or additional aspect of the present invention, in the non-braking position, the contact surface of the second brake pad does not frictionally engage the guide member.

According to an alternative or additional aspect of the present invention, in the braking position, the contact surface of the second brake pad frictionally engages the guide member.

According to an alternative or additional aspect of the present invention, a distance between the contact surface of the second brake pad and the passageway progressively decreases as the second brake pad is moved from the non-braking position to the braking position.

According to an alternative or additional aspect of the present invention, the first brake pad is statically connected to the mounting structure.

According to an alternative or additional aspect of the present invention, the braking device is configured so that when the contact surface of the second brake pad frictionally engages the guide member, the second brake pad is caused to move relative to the mounting structure of the braking device.

According to an alternative or additional aspect of the present invention, the second brake pad includes a brake pad base portion and a brake pad contact portion, the brake pad contact portion forms the contact surface of the moveable brake pad, and the brake pad contact portion is moveable relative to the brake pad base portion between a non-compressed position and a compressed position.

According to an alternative or additional aspect of the present invention, a compression spring extends between the brake pad contact portion and the brake pad base portion, and the compression spring biases the brake pad contact portion towards the non-compressed position.

According to an alternative or additional aspect of the present invention, the mounting structure includes a positioning plate that has a brake pad positioning channel, and the second brake pad includes a positioning member that engages the brake pad positioning channel to guide movement of the second brake pad as it is moved between the non-braking position and the braking position.

According to an alternative or additional aspect of the present invention, the brake pad positioning channel extends along an axis that is disposed at an angle relative to the passageway.

According to an alternative or additional aspect of the present invention, the mounting structure includes a guide plate that defines a surface that extends along an axis that is disposed at an angle relative to the passageway, a plurality of a roller elements are positioned between the second brake pad and the guide plate, and the second brake pad engages the roller elements to guide movement of the second brake pad as it is moved between the non-braking position and the braking position.

According to an alternative or additional aspect of the present invention, in the non-deployed position, a contact surface of the brake initiator does not frictionally engage the guide member.

According to an alternative or additional aspect of the present invention, in the deployed position, a contact surface of the brake initiator frictionally engages the guide member.

According to an alternative or additional aspect of the present invention, the braking device is configured to automatically return the actuatable portion of the brake initiator to the non-deployed position from the deployed position as the second brake pad moves from the non-braking position toward the braking position.

According to an alternative or additional aspect of the present invention, the braking device is configured so that the actuatable portion of the brake initiator is automatically returned to the non-deployed position from the deployed position after the actuatable portion is mistakenly actuated from the non-deployed position to the deployed position.

According to an alternative or additional aspect of the present invention, the actuatable portion of the brake initiator includes an initiator piston and an initiator housing that is connected to the second brake shoe, the initiator piston engages an inner wall of the initiator housing, and the actuatable portion of the brake initiator is biased toward the deployed position by an initiator compression spring that extends between the initiator piston and the inner wall of the initiator housing.

According to an alternative or additional aspect of the present invention, the brake initiator additionally includes a latch device that is disposed relative to the actuatable portion of the brake initiator, and the latch device is operable to selectively prevent the actuatable portion of the brake initiator from moving from the non-deployed position to the deployed position.

According to an alternative or additional aspect of the present invention, the latch device includes a latch piston and a latch compression spring, the latch piston is selectively actuatable between a latched position and an unlatched position, the latch compression spring extends between the latch piston and a wall of a chamber formed in the initiator piston to bias the latch piston towards the latched position, the latch piston engages a first portion of a channel formed in the initiator housing when the latch piston is in the latched position, and the latch piston engages a second portion of the channel formed in the initiator housing when the latch piston is in the unlatched position.

According to an alternative or additional aspect of the present invention, the latch device includes a latch lever arm that is pivotably connected to the initiator housing, the latch lever arm is selectively actuatable between a latched position and an unlatched position, the latch lever arm is biased toward the latched position by a spring, a portion of the latch lever arm extends through a channel disposed in the initiator housing to engage a flange formed in the initiator piston when the latch lever arm is in the latched position, and the latch lever arm does not engage the flange formed in the initiator piston when the latch lever arm is in the unlatched position.

According to an alternative or additional aspect of the present invention, the braking device is operable to be electronically controlled by a control unit, the control unit is adapted to selectively provide signals to the braking device to selectively actuate the actuatable portion of the brake initiator from a non-deployed position to a deployed position.

According to an alternative or additional aspect of the present invention, the control unit is operable to selectively provide signals to the braking device in response to a velocity signal received from a velocity sensing device.

These and other aspects of the present invention will become apparent in light of the drawings and detailed description provided below.

DETAILED DESCRIPTION

Figure 1:
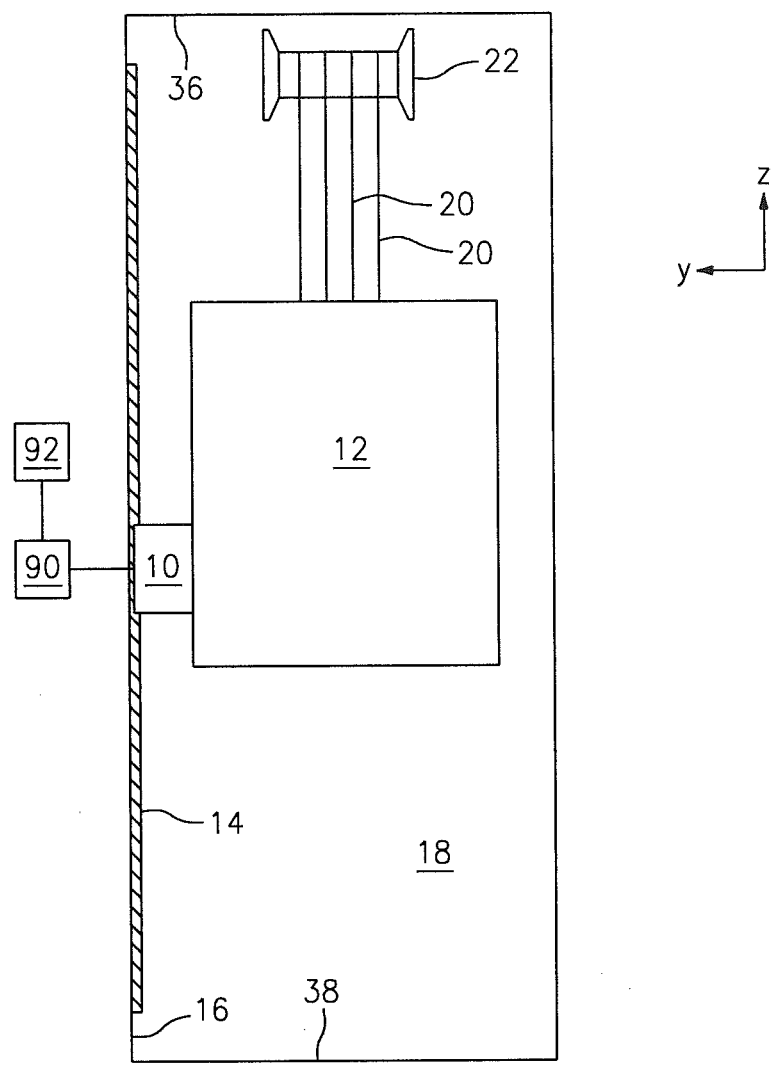
FIG. 1 illustrates a schematic view of a hoisting system that includes a braking device.
Figure 2:
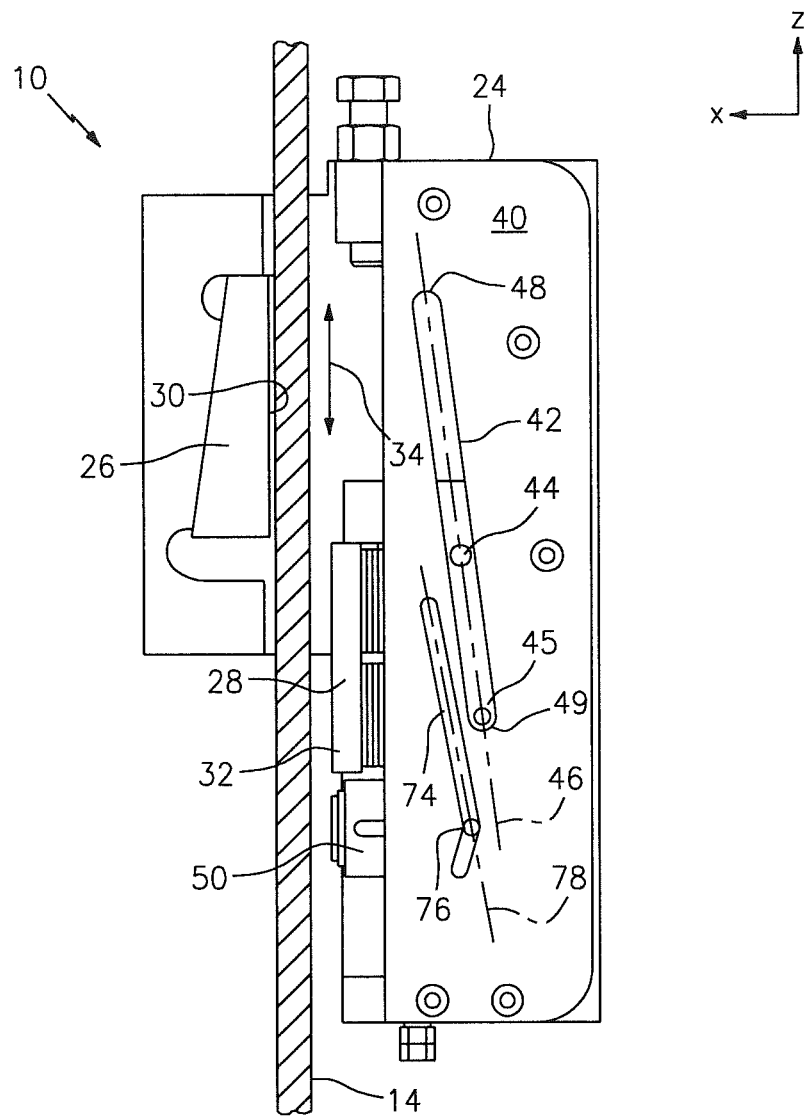
FIG. 2 illustrates an elevation view of the braking device of FIG. 1.
Figure 3:
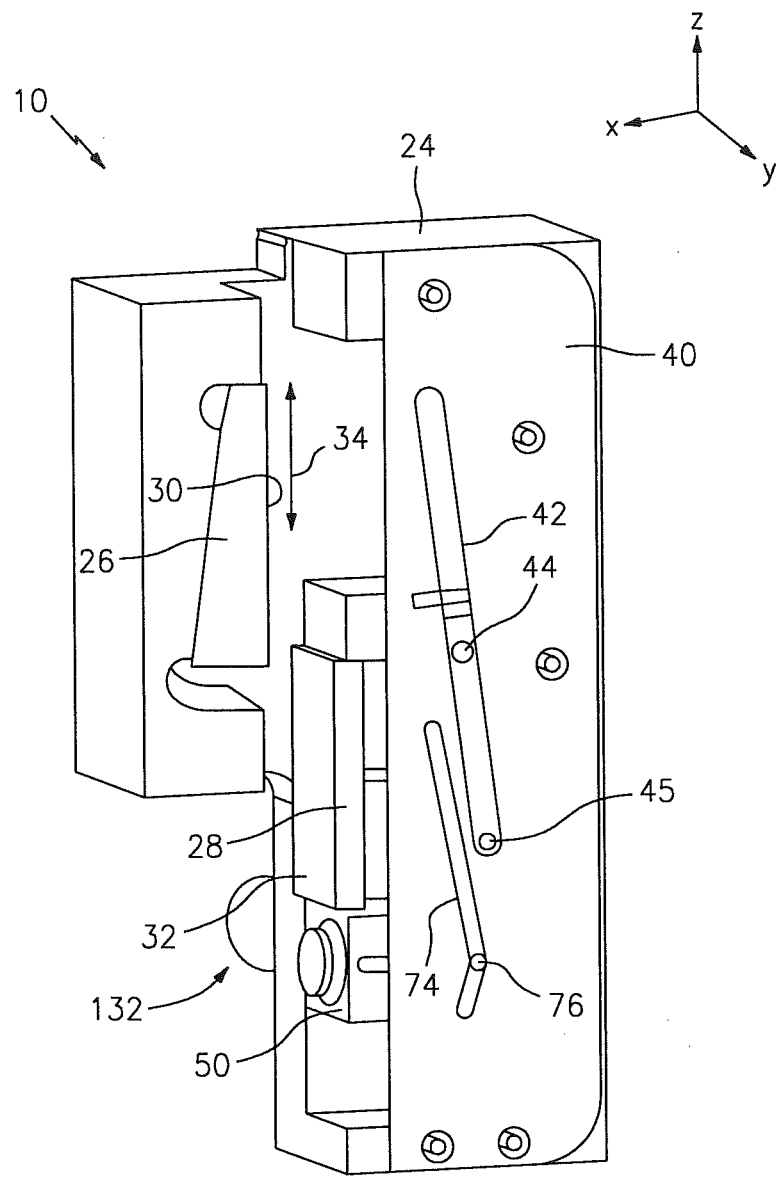
FIG. 3 illustrates a perspective view of the braking device of FIG. 1.

Referring to FIG. 1, the present disclosure describes embodiments of a braking device 10 that is operable to aid in braking (e.g., slowing or stopping movement) of a hoisted object 12 relative to a guide member 14. The present disclosure describes aspects of the present invention with reference to the embodiments illustrated in the drawings; however, aspects of the present invention are not limited to the embodiments illustrated in the drawings. The present disclosure may describe one or more features as having a length extending along a x-axis, a width extending along a y-axis, and/or a height extending along a z-axis. The drawings illustrate the respective axes.

The braking device 10 can be used with various types of hoisted objects 12 and various types of guide members 14, and the configuration (e.g., the relative positioning) of the hoisted objects 12 and the guide members 14 can vary. FIG. 1 illustrates one embodiment in which the braking device 10 is used with a hoisted object 12 that is an elevator car, and with a guide member 14 that is a steel rail that is connected to a sidewall 16 of a hoistway 18. For ease of description, the hoisted object 12 and the guide member 14 will be referred to hereinafter as the "elevator car 12" and the "rail 14", respectively. In the embodiment illustrated in FIG. 1, the elevator car 12 is connected to a counterweight (not shown) by a plurality of tension members 20, and the tension members 20 contact a sheave 22 that is operable to be selectively driven by a machine (not shown) to selectively move the elevator car 12 and the counterweight within the hoistway 18.

Referring to FIGS. 2-7, the braking device 10 includes a mounting structure 24, a first brake pad 26, and a second brake pad 28. The mounting structure 24 is connected to the elevator car 12, and the brake pads 26, 28 are positioned on the mounting structure 24 so that they are on opposing sides of a passageway 34 through which the rail 14 extends. The brake pads 26, 28 each include a contact surface 30, 32 that is operable to frictionally engage the rail 14. At least one of the brake pads 26, 28 engages (e.g., slidably engages) the mounting structure 24 in a manner that enables it to move relative to the mounting structure 24 between a non-braking position (see FIGS. 2-5 and 7) and a braking position (see FIG. 6). In the non-braking position, the contact surface 32 of the moveable brake pad 28 is not in contact with the rail 14, and thus it does not frictionally engage the rail 14. In the braking position, the contact surface 32 of the moveable brake pad 28 is in contact with the rail 14, and thus it frictionally engages the rail 14. The braking device 10 is configured so that as the moveable brake pad 28 is moved from the non-braking position toward the braking position, a distance between the contact surface 32 of the moveable brake pad 28 and the passageway 34 decreases. Consequentially, as the moveable brake pad 28 is moved from the non-braking position toward the braking position, frictional forces between the contact surface 32 of the moveable brake pad 28 and the rail 14 increase. When the moveable brake pad 28 is in the braking position, frictional forces between the contact surfaces 30, 32 of the brake pads 26, 28 and the rail 14 may be sufficient, by themselves, to stop movement of the braking device 10 (and thus the elevator car 12 to which the braking device 10 is connected) relative to the rail 14.

The braking device 10 is configured such that, when the contact surface 32 of the moveable brake pad 28 frictionally engages the rail 14, the moveable brake pad 28 may be caused to move relative to the mounting structure 24 of the braking device 10. The direction of movement of the moveable brake pad 28 relative to the mounting structure 24 depends on the direction of movement of the mounting structure 24 relative to the rail 14. Referring to the embodiment illustrated in FIG. 2, for example, movement of the mounting structure 24 in a downward heightwise direction relative to the rail 14 may cause the moveable brake pad 28 to move from the non-braking position toward the braking position, whereas movement of the mounting structure 24 in an upward heightwise direction relative to the rail 14 may cause the moveable brake pad 28 to move from the braking position toward the non-braking position. Movement of the mounting structure 24 in a downward heightwise direction relative to the rail 14 may correspond to movement of the elevator car 12 (see FIG. 1) from a position in the hoistway 18 (see FIG. 1) proximate the hoistway ceiling 36 (see FIG. 1) toward a position in the hoistway 18 proximate the hoistway floor 38 (see FIG. 1), whereas movement of the mounting structure 24 in an upward heightwise direction relative to the rail 14 may correspond to movement of the elevator car 12 from a position in the hoistway 18 proximate the hoistway floor 38 toward a position in the hoistway 18 proximate the hoistway ceiling 36.

Figure 6:
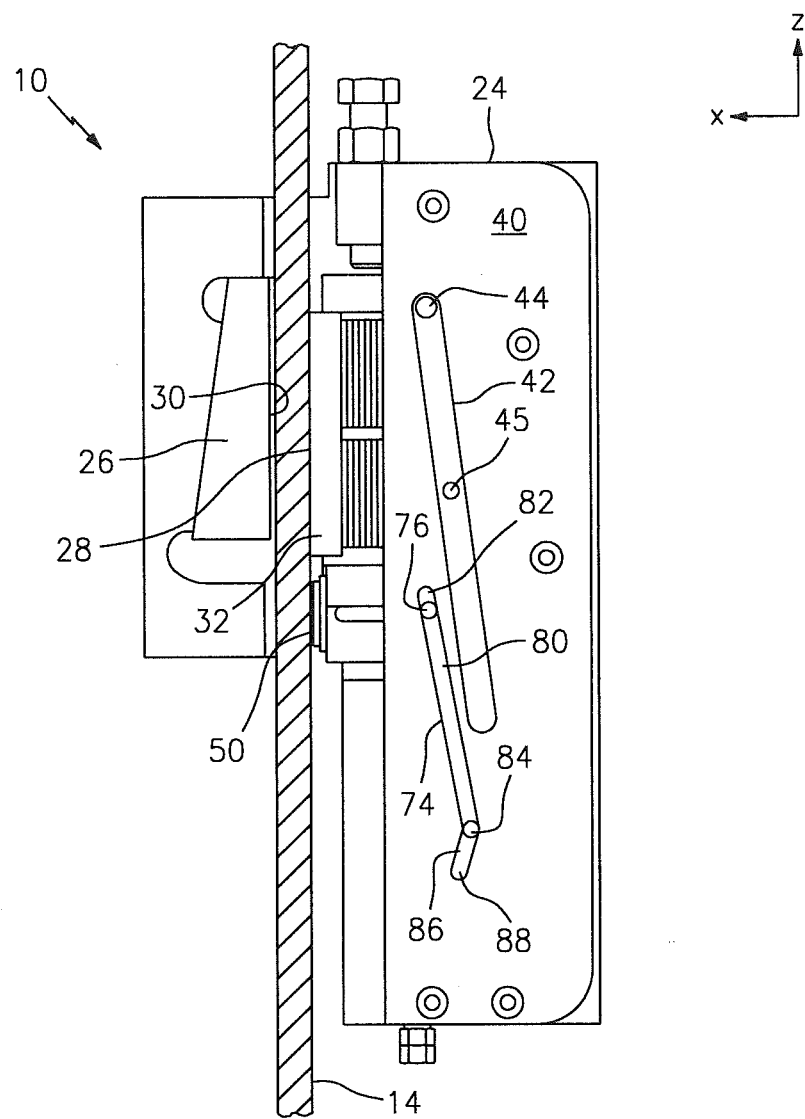
FIG. 6 illustrates an elevation view of the braking device of FIG. 1.
Figure 7:
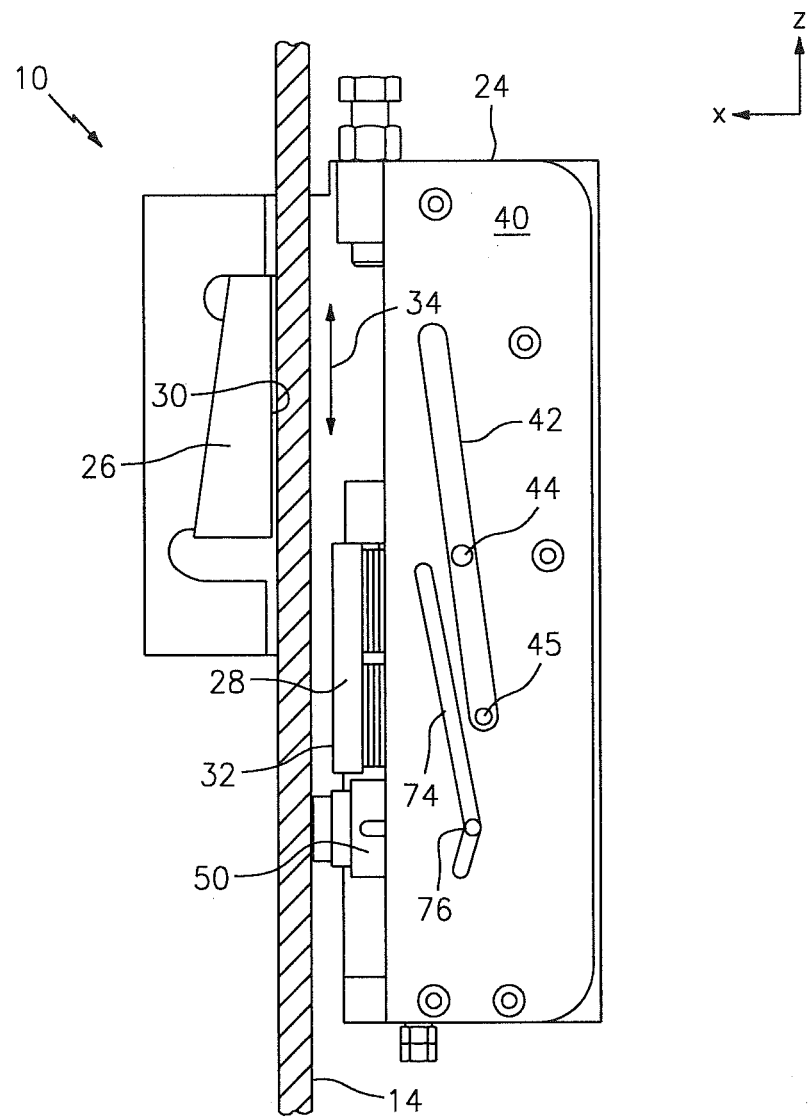
FIG. 7 illustrates an elevation view of the braking device of FIG. 1.

The above-described functionality of the brake pads 26, 28 can be implemented in various different ways. In the embodiment illustrated in FIGS. 2-7, the first brake pad 26 is statically connected to the mounting structure 24 of the braking device 10, and the second brake pad 28 (i.e., the moveable brake pad 28) slidably engages the mounting structure 24 in a manner that enables it to move relative to the mounting structure 24 between a non-braking position and a braking position. FIGS. 2-5 and 7 illustrate the moveable brake pad 28 in the non-braking position. In FIGS. 2-5 and 7, the contact surface 32 of the moveable brake pad 28 is not in contact with the rail 14, and thus it is not frictionally engaging the rail 14. FIG. 6 illustrates the moveable brake pad 28 in the braking position. In FIG. 6, the contact surface 32 of the moveable brake pad 28 is in contact with the rail 14, and thus it is frictionally engaging the rail 14. In the braking position shown in FIG. 6, the contact surfaces 30, 32 of the brake pads 26, 28 are separated from one another by a lengthwise-extending distance that is less than a lengthwise-extending distance that separates the contact surfaces 30, 32 in the non-braking position shown in FIGS. 2-5 and 7.

Figure 8:
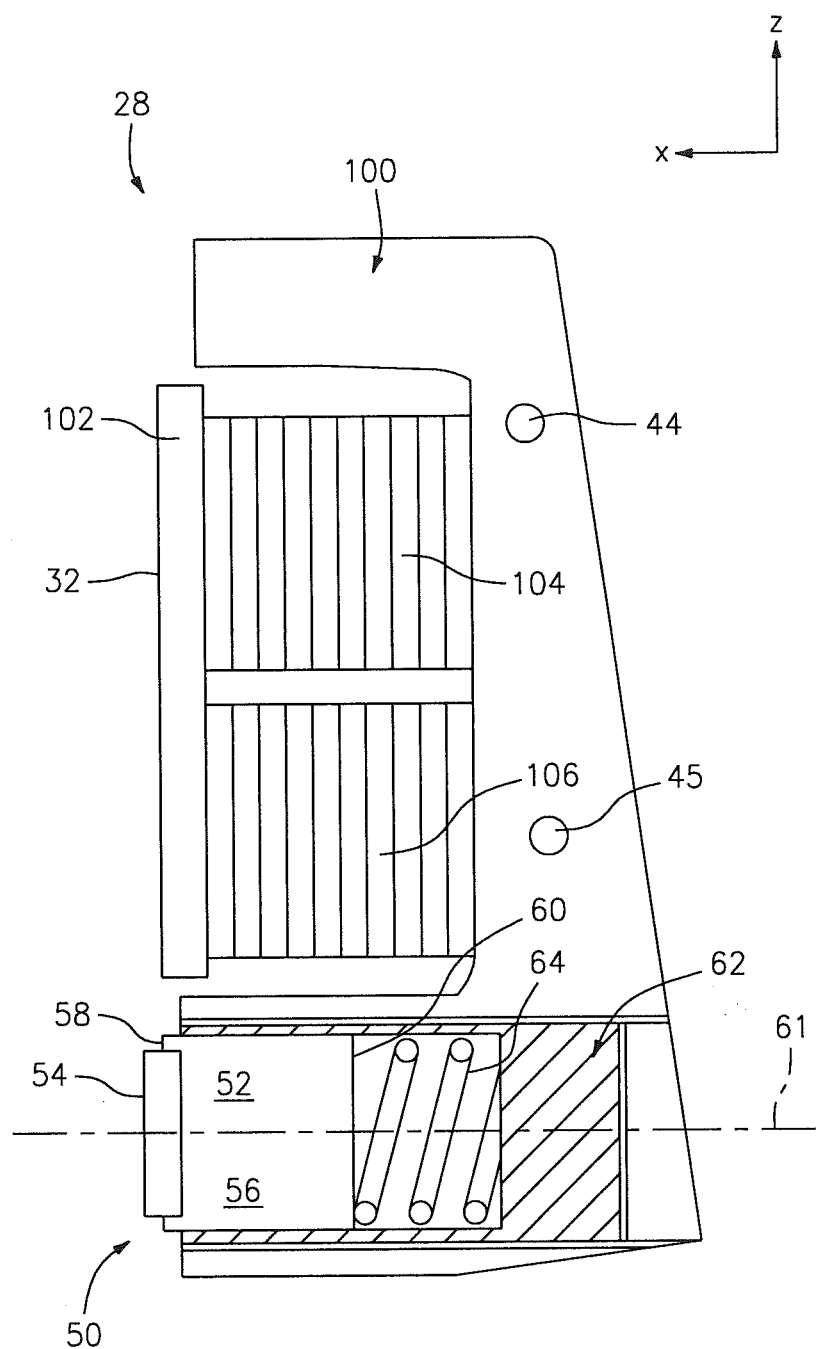
FIG. 8 illustrates a sectional elevation view of the second braking shoe included in the braking device of FIG. 1.
Figure 9:
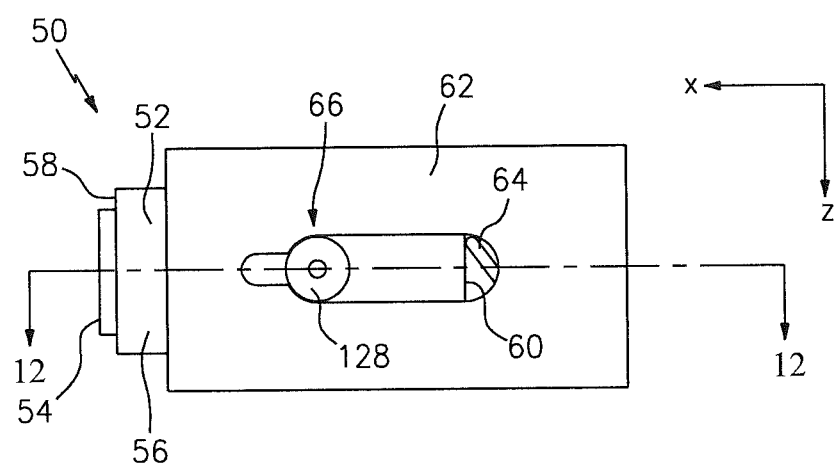
FIG. 9 illustrates an elevation view of the brake initiator included in the braking device of FIG. 1.
Figure 10:
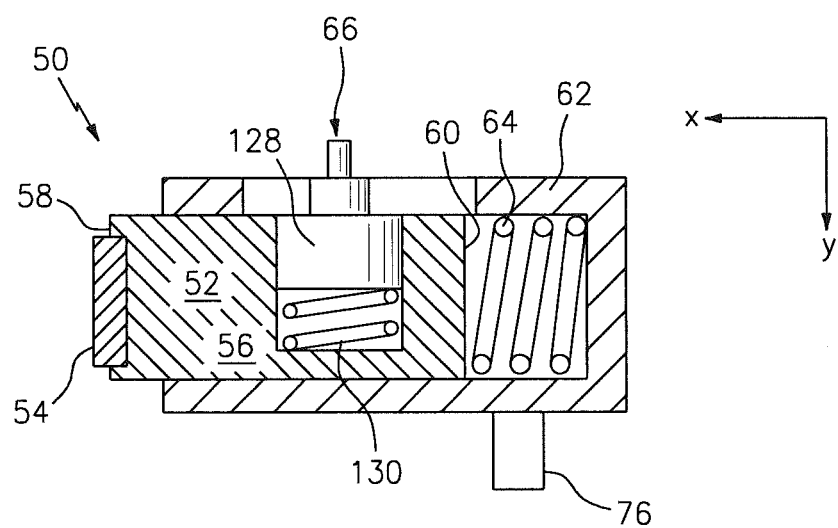
FIG. 10 illustrates a sectional plan view of the brake initiator of FIG. 9.
Figure 11:
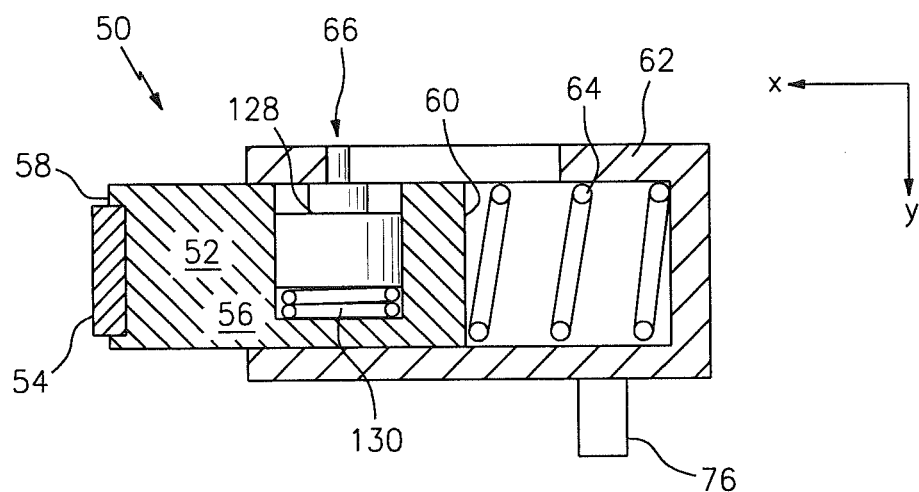
FIG. 11 illustrates a sectional plan view of the brake initiator of FIG. 9.

In the embodiment illustrated in FIG. 8, the second brake pad 28 (i.e., the moveable brake pad 28) includes a brake pad base portion 100 and a brake pad contact portion 102. In this embodiment, the brake pad contact portion 102 forms the contact surface 32 of the moveable brake pad 28; the brake pad contact portion 102 is moveable relative to the brake pad base portion 100 between a non-compressed position (see FIG. 8) and a compressed position; a plurality of compression springs 104, 106 extend in a lengthwise direction between the brake pad contact portion 102 and the brake pad base portion 100; and the compression springs 104, 106 bias the brake pad contact portion 102 towards the non-compressed position. In this embodiment, when the moveable brake pad 28 is in the non-braking position (FIGS. 2-5 and 7), the brake pad contact portion 102 is in the non-compressed position. In this embodiment, as the moveable brake pad 28 is moved from the non-braking position (FIGS. 2-5 and 7) to the braking position (FIG. 6), the brake pad contact portion 102 is caused to move towards the compressed position, thereby causing frictional forces between the contact surface 32 of the moveable brake pad 28 and the rail 14 to increase, and thereby causing the entire braking device 10 (and thus the elevator car 12 that the braking device 10 is connected to) to move relative to the rail 14 such that the contact surface 30 of the first brake pad 26 is moved into contact with the rail 14. In this embodiment, when the moveable brake pad 28 is in the braking position, frictional forces between the contact surfaces 30, 32 of the brake pads 26, 28 and the rail 14 can cause the brake pad contact portion 102 of the moveable brake pad 28 to gradually move towards the compressed position, which in turn further increases the frictional forces between the contact surfaces 30, 32 of the brake pads 26, 28 and the rail 14.

In the embodiment illustrated in FIGS. 2-7, the mounting structure 24 of the braking device 10 includes a positioning channel plate 40 (see FIGS. 2-3, and 6-7) that has a brake pad positioning channel 42; the moveable brake pad 28 includes first and second positioning members 44, 45 that extend in a widthwise direction from the brake pad base portion 100 of the moveable brake pad 28 to engage the brake pad positioning channel 42 to guide movement of the moveable brake pad 28 as it is moved between the non-braking position and the braking position; and the brake pad positioning channel 42 extends along an axis 46 (see FIG. 2) that is disposed at an angle relative to the passageway 34, and so that a first end 48 (see FIG. 2) of the brake pad positioning channel 42 proximate the contact surface 30 of the first brake pad 26 is separated from the passageway 34 by a lengthwise distance that is less than a lengthwise distance that separates an opposing second end 49 (see FIG. 2) of the brake pad positioning channel 42 from the passageway 34. The configuration of the brake pad positioning channel 42 can vary, for example, depending on a characteristic (e.g., a size, a shape) of the rail 14 and/or one or more other components of the braking device 10.

Figure 4:
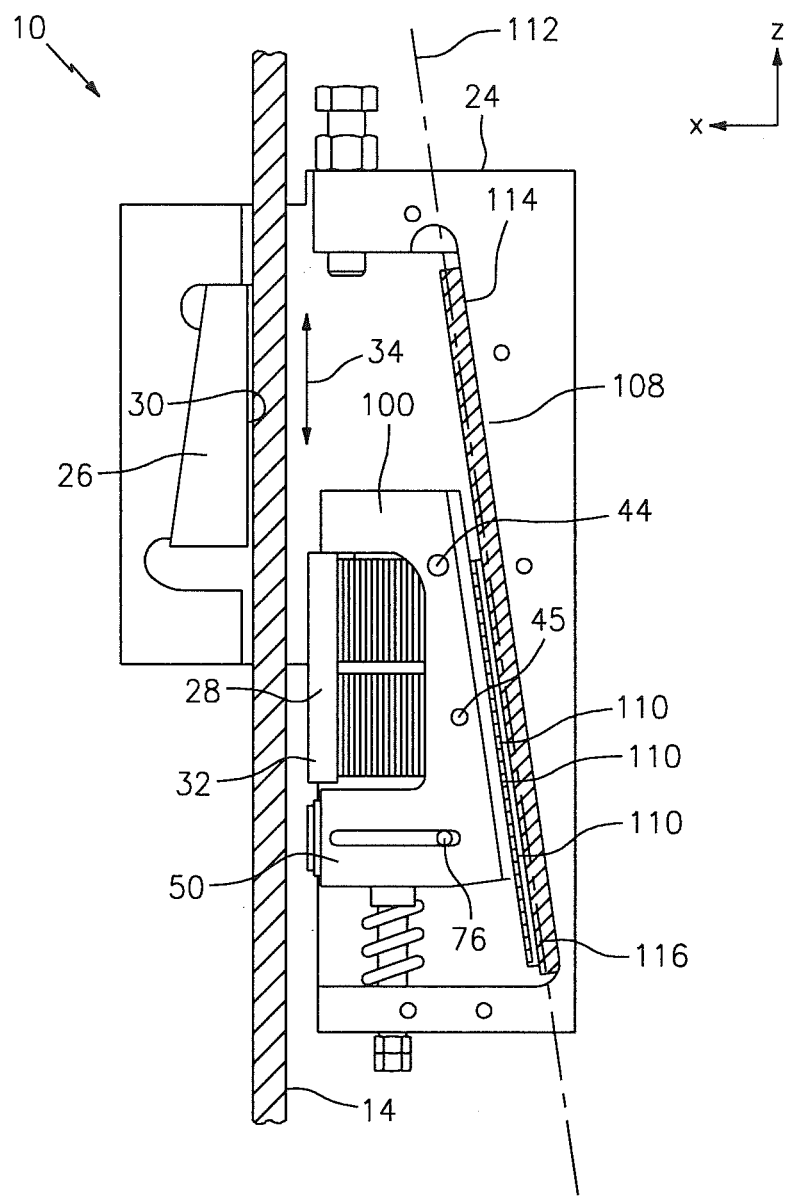
FIG. 4 illustrates an elevation view of the braking device of FIG. 1 with the positioning plate omitted.
Figure 5:
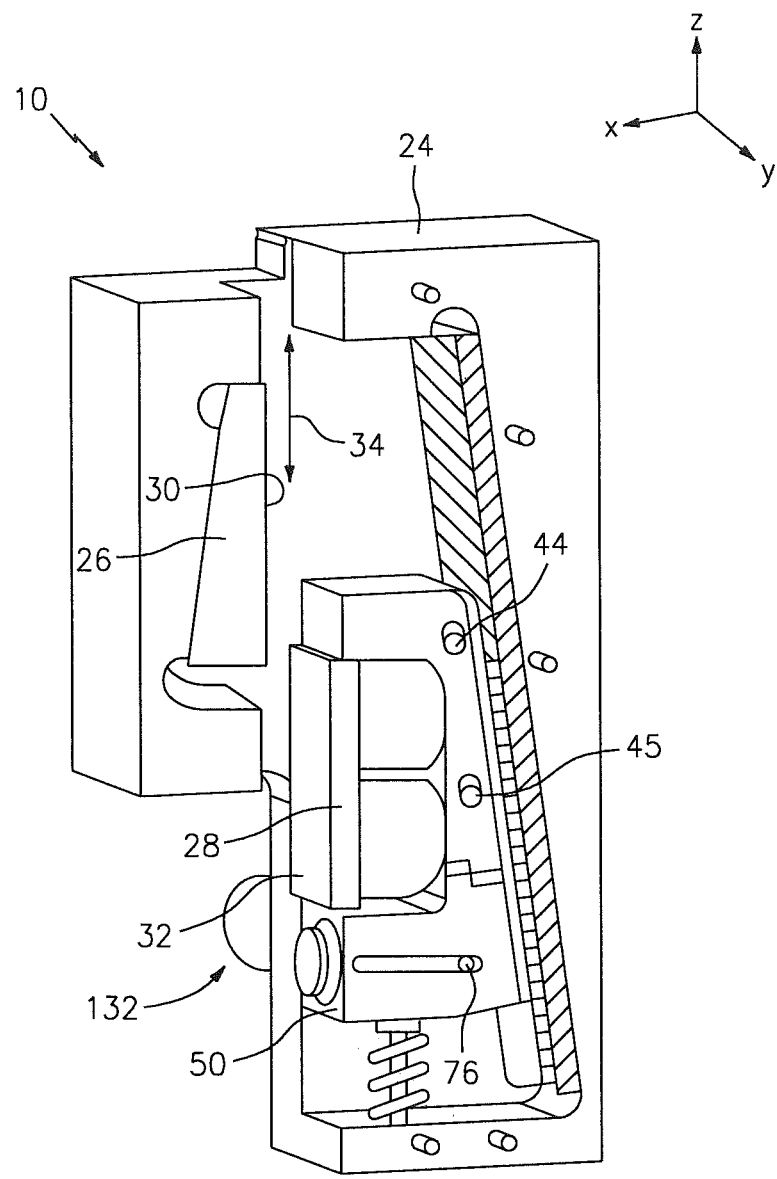
FIG. 5 illustrates a perspective view of the braking device of FIG. 1 with the positioning plate omitted.

In the embodiment illustrated in FIG. 4, the mounting structure 24 of the braking device 10 also includes a guide plate 108, and the braking device 10 includes a plurality of a roller elements 110 positioned between the brake pad base portion 100 of the moveable brake pad 28, and the guide plate 108. In this embodiment, the brake pad base portion 100 of the moveable brake pad 28 is positioned between the brake pad contact portion 102 and the roller elements 110; the guide plate 108 defines a surface that extends along an axis 112 that is disposed at an angle relative to the passageway 34; a first end 114 of the guide plate 108 proximate the contact surface 30 of the first brake pad 26 is separated from the passageway 34 by a lengthwise distance that is less than a lengthwise distance that separates an opposing second end 116 of the brake pad positioning channel 42 from the passageway 34; and the brake pad base portion 100 of the moveable brake pad 28 engages the roller elements 110 to guide movement of the moveable brake pad 28 as it is moved between the non-braking position and the braking position. The configuration of the guide plate 108 can vary, for example, depending on a characteristic (e.g., a size, a shape) of the rail 14 and/or one or more other components of the braking device 10.

Referring again to FIGS. 2-7, the braking device 10 additionally includes at least one brake initiator 50 that is selectively operable to initiate movement of the moveable brake pad 28 from the non-braking position toward the braking position by selectively frictionally engaging the rail 14. Referring to FIGS. 8-11, the brake initiator 50 includes an actuatable portion 52 and a contact surface 54 that is disposed relative to the actuatable portion 52. The actuatable portion 52 of the brake initiator 50 is selectively actuatable between a non-deployed position and a deployed position. When the actuatable portion 52 of the brake initiator 50 is in the non-deployed position (see FIGS. 2-5, and 8-10), the contact surface 54 of the brake initiator 50 is not in contact with the rail 14, and thus the contact surface 54 does not frictionally engage the rail 14. When the actuatable portion 52 of the brake initiator 50 is in the deployed position (see FIGS. 7 and 11), the contact surface 54 of the brake initiator 50 is in contact with the rail 14, and thus the contact surface 54 frictionally engages the rail 14. The brake initiator 50 is connected to the moveable brake pad 28 such that the brake initiator 50 and the moveable brake pad 28 move together relative to the mounting structure 24 of the braking device 10. As a result, after the actuatable portion 52 of the brake initiator 50 is selectively actuated from the non-deployed position to the deployed position, frictional forces between the contact surface 54 of the brake initiator 50 and the rail 14 may initiate movement of the moveable brake pad 28 from the non-braking position toward the braking position. In some embodiments, the braking device 10 is configured so that the actuatable portion 52 of the brake initiator 50 is automatically returned to the non-deployed position from the deployed position as the moveable brake pad 28 moves from the non-braking position toward the braking position. The term "automatically" and variations thereof are used herein relative to the actuatable portion 52 of the brake initiator 50 to indicate that the actuatable portion 52 is returned to the non-deployed position from the deployed position without intervention, notification, or involvement of an operator (e.g., a human operator, a computer operator). In some embodiments, the braking device 10 is configured so that the actuatable portion 52 of the brake initiator 50 is automatically returned to the non-deployed position from the deployed position after the actuatable portion 52 is mistakenly actuated from the non-deployed position to the deployed position.

Figure 12:
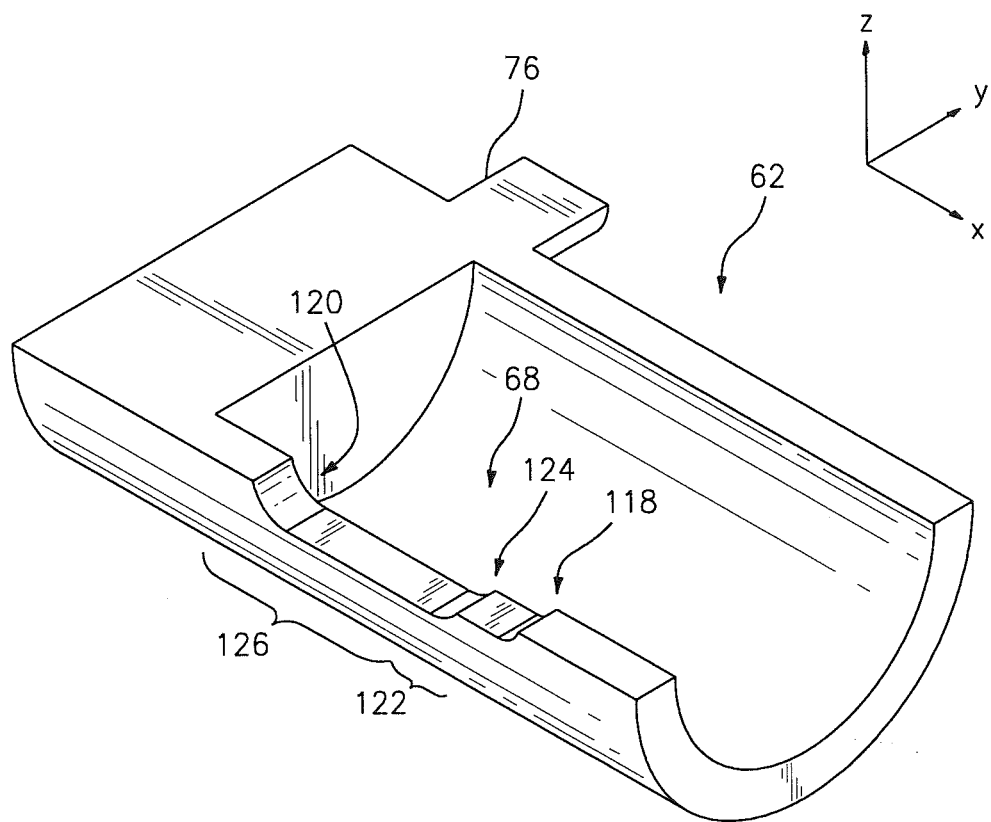
FIG. 12 illustrates a sectional perspective view of the initiator housing included in the brake initiator of FIG. 9.
Figure 13:
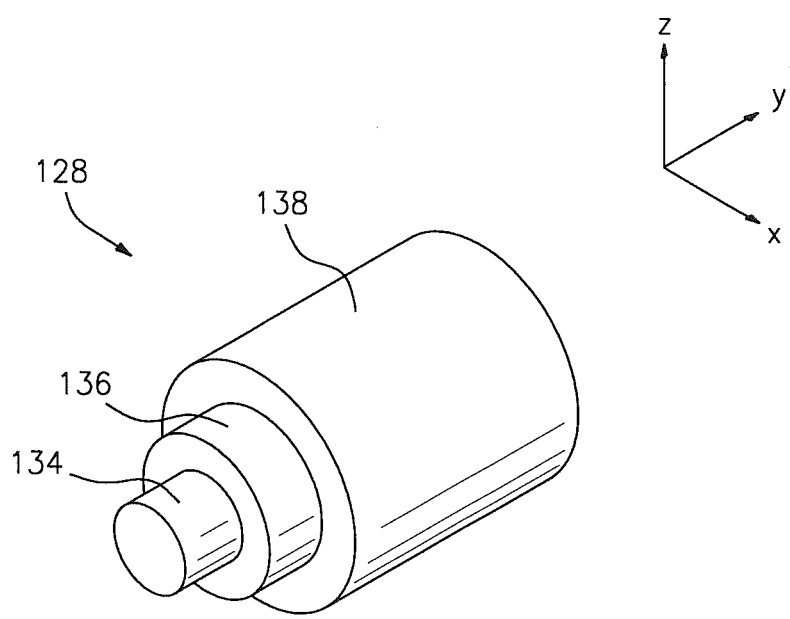
FIG. 13 illustrates a perspective view of the latch piston included in the brake initiator of FIG. 9.
Figure 14:
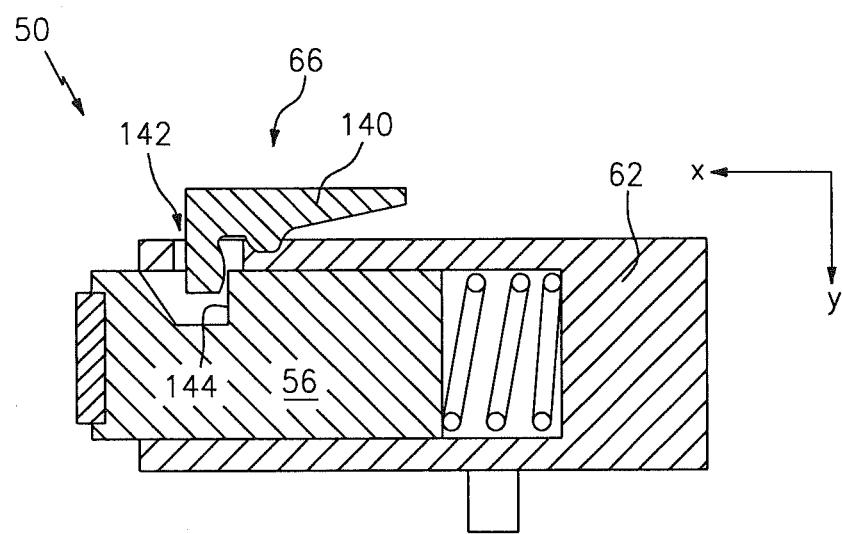
FIG. 14 illustrates a sectional plan view of another brake initiator.

The above-described functionality of the brake initiator 50 can be implemented in various different ways. In the embodiment illustrated in FIGS. 8-13, the actuatable portion 52 of the brake initiator 50 includes a cylindrical initiator piston 56 (see FIGS. 8-11); the initiator piston 56 includes an outer surface that extends between first and second ends 58, 60 of the initiator piston 56; and an outer surface of the initiator piston 56 extends concentrically around a lengthwise-extending piston axis 61 (see FIG. 8). In this embodiment, the actuatable portion 52 of the brake initiator 50 (e.g., the initiator piston 56) is biased toward the deployed position by an initiator compression spring 64 (see FIGS. 8-11) that extends between the second end 60 of the initiator piston 56 and the inner wall of the initiator housing 62. In this embodiment, the brake initiator 50 also includes an initiator housing 62 (see FIGS. 8-12) that is disposed relative to the brake pad base portion 100 of the moveable brake pad 28; the outer surface of the initiator piston 56 slidably engages an inner wall of the initiator housing 62; the initiator housing 62 includes a housing channel 68 that extends in lengthwise direction between first and second ends 118, 120 (see FIG. 12); and the housing channel 68 has a first housing subchannel 122 (see FIG. 12) that extends in a lengthwise direction between the first end 118 and an intersection portion 124 (see FIG. 12), and a second housing subchannel 126 (see FIG. 12) that extends between the intersection portion 124 and the second end 120. In this embodiment, the brake initiator 50 additionally includes a latch device 66 (see FIGS. 9-11) that is disposed relative to the actuatable portion 52 of the brake initiator 50, and that is operable to selectively prevent the actuatable portion 52 of the brake initiator 50 from moving from the non-deployed position to the deployed position. In this embodiment, the latch device 66 includes a latch piston 128 (see FIGS. 9-11 and 13) and a latch compression spring 130 (see FIGS. 10-11); the latch piston 128 is selectively actuatable, by a solenoid 132 (see FIGS. 3 and 5), between a latched position (see FIG. 10) and an unlatched position (see FIG. 11); the latch piston 128 includes a first cylindrical portion 134 (see FIG. 13), a second cylindrical portion 136 (see FIG. 13), and a third cylindrical portion 138 (see FIG. 13); the first cylindrical portion 134 has a diameter that is substantially equal to a height of the first housing subchannel 122, the second cylindrical portion 136 has a diameter that is substantially equal to a height of the second housing subchannel 126, and the third cylindrical portion 138 has a diameter that is substantially equal to a diameter of a widthwise-extending chamber formed in the initiator piston 56; the latch compression spring 130 extends between the third cylindrical portion 138 of the latch piston 128 and a wall of the chamber formed in the initiator piston 56; and the latch compression spring 130 biases the latch piston 128 towards the latched position (see FIG. 10). In this embodiment, when the actuatable portion 52 of the brake initiator 50 is in the non-deployed position (see FIGS. 2-6, and 8-10), the second cylindrical portion 136 of the latch piston 128 is aligned with the second housing subchannel 126 of the housing channel 68 such that it (the second cylindrical portion 136) engages the intersection portion 124 of the housing channel 68. In this embodiment, when the actuatable portion 52 of the brake initiator 50 is in the deployed position (see FIGS. 7 and 11), the first cylindrical portion 134 of the latch piston 128 is aligned with the first housing subchannel 122 of the housing channel 68 such that it (the first cylindrical portion 134) engages the first end 118 of the housing channel 68. FIG. 14 illustrates an example of a brake initiator 50 that includes a different type of latch device 66. In this embodiment, the latch device 66 includes a latch lever arm 140 that is pivotably connected to the initiator housing 62 and is selectively actuatable by the solenoid 132 (see FIGS. 3 and 5) between a latched position (see FIG. 14) and an unlatched position (not shown); and the latch lever arm 140 is biased toward the latched position by a spring (not shown). In this embodiment, when the latch lever arm 140 is in the latched position, a portion of the latch lever arm 140 extends through a channel 142 disposed in the initiator housing 62 to engage a latching surface 144 formed in the initiator piston 56. In the unlatched position, the latch lever arm 140 does not engage the latching surface.

The above-described functionality of the automatic return features of the brake initiator 50 can be implemented in various different ways. In the embodiment illustrated in FIGS. 2-7, the positioning channel plate 40 (see FIGS. 2-3, and 6-7) of the mounting structure 24 additionally includes an initiator positioning channel 74, and the initiator housing 62 of the brake initiator 50 includes an initiator positioning member 76 that extends from the initiator housing 62 in a widthwise direction to engage the initiator positioning channel 74. In this embodiment, as the brake initiator 50 is moved with the second brake pad 28 (i.e., the moveable brake pad 28) from the non-braking position toward the braking position, the engagement of the initiator positioning member 76 with the initiator positioning channel 74 causes the initiator housing 62 to be moved in a lengthwise direction relative to the actuatable portion 52 of the brake initiator 50 in a manner that enables the latch piston 128 of the latch device 66 to be biased from the unlatched position to the latched position. In this embodiment, as the brake initiator 50 is moved with the second brake pad 28 from the braking position back towards the non-braking position, the actuatable portion 52 of the brake initiator 50 will be in the non-deployed position. The initiator positioning channel 74 illustrated in FIGS. 2-3, and 6-7 is configured similarly to the brake pad positioning channel 42; e.g., at least a portion of the initiator positioning channel 74 extends along an axis 78 (see FIG. 2) that is disposed at an angle relative to the passageway 34, etc. The configuration of the initiator positioning channel 74 can vary, for example, depending on a characteristic (e.g., a size, a shape) of the rail 14 and/or one or more components of the braking device 10.

In the embodiment illustrated in FIGS. 2-7, the initiator positioning channel 74 (see FIGS. 2-3, and 6-7) is also configured such that the actuatable portion 52 of the brake initiator 50 is automatically returned to the non-deployed position from the deployed position after the actuatable portion 52 is mistakenly actuated from the non-deployed position to the deployed position while the rail 14 is moving in a downward heightwise direction relative to the mounting structure 24. In this embodiment, the initiator positioning channel 74 includes a first subchannel 80 (see FIG. 6) that extends between a first end 82 and an intersection portion 84 of the initiator positioning channel 74, and a second subchannel 86 (see FIG. 6) that extends between the intersection portion 84 and a second end 88 of the initiator positioning channel 74; and the first and second subchannels 80, 86 of the initiator positioning channel 74 are configured so that the initiator positioning channel 74 is generally v-shaped. In this embodiment, when the second brake pad 28 (i.e., the moveable brake pad 28) is in the non-braking position (see FIGS. 2-5 and 7), the initiator positioning member 76 engages the intersection portion 84 of the initiator positioning channel 74, and when the second brake pad 28 is in the braking position (see FIG. 6), the initiator positioning member 76 is disposed proximate the first end 82 of the initiator positioning channel 74. In this embodiment, if the actuatable portion 52 is mistakenly actuated from the non-deployed position to the deployed position while the rail 14 is moving in a downward heightwise direction relative to the mounting structure 24, frictional forces between the contact surface 54 of the brake initiator 50 and the rail 14 may cause movement of the brake initiator 50 and the second brake pad 28 in a heightwise direction toward the second end 88 of the initiator positioning channel 74. In this embodiment, as the brake initiator 50 is moved from the non-braking position in this direction, the engagement of the initiator positioning member 76 with the second subchannel 86 of the initiator positioning channel 74 causes the initiator housing 62 to be moved in a lengthwise direction relative to the actuatable portion 52 of the brake initiator 50 in a manner that enables the latch device 66 to move from the unlatched position to the latched position. In this embodiment, as the brake initiator 50 is subsequently moved with the second brake pad 28 back to the non-braking position, the actuatable portion 52 of the brake initiator 50 will be in the non-deployed position.

In some embodiments, the braking device 10 is operable to be electronically controlled by a control unit 90. In the embodiment illustrated in FIG. 1, the braking device 10 is electrically connected to the control unit 90 via a wired connection. The control unit 90 is adapted (e.g., programmed) to selectively provide signals to and/or receive signals from the braking device 10 to cause the braking device 10 to perform one or more of the functions described above. In the embodiment illustrated in FIG. 1, for example, the control unit 90 is adapted to selectively provide brake signals to the solenoid 132 (see FIGS. 3 and 5) to actuate the latch piston 128 from the latched position (see FIG. 10) to the unlatched position (see FIG. 11), which in turn actuates the actuatable portion 52 of the brake initiator 50 from the non-deployed position and the deployed position, which in turn initiates movement of the moveable brake shoe 28 from the non-braking position to the braking position, which in turn causes the braking device 10 to brake the elevator car 12 relative to the rail 14. The functionality of the control unit 90 may be implemented using hardware, software, firmware, or a combination thereof. In some embodiments, for example, the control unit 90 may include one or more programmable processors. A person having ordinary skill in the art would be able to adapt (e.g., program) the control unit 90 to perform the functionality described herein without undue experimentation.

In some embodiments, including the embodiment illustrated in FIG. 1, the control unit 90 may be adapted to selectively provide signals to the braking device 10 in response to a velocity signal received from a velocity sensing device 92. The velocity signal may be indicative of a velocity of the elevator car 12 relative to the rail 14. The functionality of the velocity sensing device 92 may be implemented using hardware, software, firmware, or a combination thereof. A person skilled in the art would be able to adapt (e.g., program) the velocity sensing device 92 to perform the functionality described herein without undue experimentation. Although the velocity sensing device 92 is described herein as being separate from the control unit 90, in some embodiments the velocity sensing device 92 may be implemented as a feature of the control unit 90.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents.

What is claimed is:

1. A braking device that is operable to aid in braking a hoisted object relative to a guide member, comprising:
   a mounting structure connected to the hoisted object;
   a first brake pad and a second brake pad, wherein the first and second brake pads are positioned on the mounting structure so that they are on opposing sides of a passageway through which the guide member extends, wherein the first and second brake pads each comprise a contact surface that is operable to frictionally engage the guide member, and wherein the second brake pad engages the mounting structure in a manner that enables the second brake pad to move relative to the mounting structure between a non-braking position and a braking position; and
   a brake initiator that is selectively operable to initiate movement of the second brake pad from the non-braking position toward the braking position by selectively actuating an actuatable portion of the brake initiator from a non-deployed position to a deployed position,
wherein the actuatable portion of the brake initiator comprises an initiator piston and an initiator housing that is connected to the second brake shoe, wherein the initiator piston engages an inner wall of the initiator housing, and wherein the actuatable portion of the brake initiator is biased toward the deployed position by an initiator compression spring that extends between the initiator piston and the inner wall of the initiator housing,
wherein the brake initiator additionally comprises a latch device that is dispose relative to the actuatable portion of the brake initiator, and wherein the latch device is operable to selectively prevent the actuatable portion of the brake initiator from moving from the non-deployed position to the deployed position, and
wherein the latch device comprises a latch lever arm that is pivotably connected to the initiator housing, wherein the latch lever arm is selectively actuatable between a latched position and an unlatched position, wherein the latch lever arm is biased toward the latched position by a spring, wherein a portion of the latch-lever arm extends through a channel disposed in the initiator housing to engage a flange formed in the initiator piston when the latch lever arm is in the latched position, and wherein the latch lever arm does not engage the flange formed in the initiator piston when the latch lever is in the unlatched position.

2. The braking device of claim 1, wherein in the non-braking position, the contact surface of the second brake pad does not frictionally engage the guide member.

3. The braking device of claim 1, wherein in the braking position, the contact surface of the second brake pad frictionally engages the guide member.

4. The braking device of claim 1, wherein a distance between the contact surface of the second brake pad and the passageway progressively decreases as the second brake pad is moved from the non-braking position to the braking position.

5. The braking device of claim 1, wherein the first brake pad is statically connected to the mounting structure.

6. The braking device of claim 1, wherein the braking device is configured so that when the contact surface of the second brake pad frictionally engages the guide member, the second brake pad is caused to move relative to the mounting structure of the braking device.

7. The braking device of claim 1, wherein the second brake pad includes a brake pad base portion and a brake pad contact portion, wherein the brake pad contact portion forms the contact surface of the moveable brake pad, and wherein the brake pad contact portion is moveable relative to the brake pad base portion between a non-compressed position and a compressed position.

8. The braking device of claim 7, wherein a compression spring extends between the brake pad contact portion and the brake pad base portion, and wherein the compression spring biases the brake pad contact portion towards the non-compressed position.

9. The braking device of claim 1, wherein the mounting structure comprises a positioning plate that has a brake pad positioning channel, and wherein the second brake pad comprises a positioning member that engages the brake pad positioning channel to guide movement of the second brake pad as it is moved between the non-braking position and the braking position.

10. The braking device of claim 9, wherein the brake pad positioning channel extends along an axis that is disposed at an angle relative to the passageway.

11. The braking device of claim 1, wherein the mounting structure comprises a guide plate that defines a surface that extends along an axis that is disposed at an angle relative to the passageway, wherein a plurality of a roller elements are positioned between the second brake pad and the guide plate, and wherein the second brake pad engages the roller elements to guide movement of the second brake pad as it is moved between the non-braking position and the braking position.

12. The braking device of claim 1, wherein in the non-deployed position, a contact surface of the brake initiator does not frictionally engage the guide member.

13. The braking device of claim 1, wherein in the deployed position, a contact surface of the brake initiator frictionally engages the guide member.

14. The braking device of claim 1, wherein the braking device is operable to be electronically controlled by a control unit, wherein the control unit is adapted to selectively provide signals to the braking device to selectively actuate the actuatable portion of the brake initiator from a non-deployed position to a deployed position.

15. The braking device of claim 14, wherein the control unit is operable to selectively provide signals to the braking device in response to a velocity signal received from a velocity sensing device.

* * * * *